Patented Nov. 12, 1929

1,735,493

UNITED STATES PATENT OFFICE

HYYM E. BUC, OF ROSELLE, NEW JERSEY, ASSIGNOR TO STANDARD OIL DEVELOPMENT COMPANY, A CORPORATION OF DELAWARE

VARNISH

No Drawing. Application filed September 15, 1927. Serial No. 219,826.

This invention relates to the manufacture of varnishes comprising a calcium salt of an oil soluble sulphonate.

When petroleum distillates and particularly lubricating distillates are treated with fuming sulphuric acid or sulphuric anhydride, certain acids are formed and are found in the oil phase at the expiration of the treatment. These acids are characterized by the presence of sulphur in combination and are predominantly oil soluble. For the purposes of this application they are termed oil soluble sulphonic acids and the metallic derivatives thereof oil soluble sulphonates. These acids are ordinarily neutralized to form oil soluble sodium sulphonate and extracted from the oil phase by the use of a selective solvent such as a mixture of alcohol and water. After extraction and separation of the solvent containing dissolved sulphonate, the same is heated to distill off the solvent, leaving a residue of crude oil soluble sodium sulphonate together with some petroleum oil.

In accordance with my method, I preferably remove any oil which accompanies the sulphonate by dissolving the crude material in an aqueous alcoholic solution, preferably containing 35 to 65% by weight of alcohol and thereafter contacting the solution so made with a small proportion of gasoline, say one-tenth to one-fifth of the total volume. A number of such extractions with gasoline may be employed successively although I usually employ from four to six. The oil migrates selectively into the gasoline phase, leaving an alcoholic solution of sodium sulphonate relatively free of oil.

The sodium sulphonate is then recovered from solution by evaporation of the solvent and is dissolved in water to be converted into calcium sulphonate by the usual metathetical reactions. I preferably form a dilute aqueous solution thereof, viz, one containing 5% or less of sodium sulphonate. Calcium chloride or other soluble salt of calcium is then gradually added to the solution with continuous stirring until precipitation ceases. The crude plastic calcium sulphonate so precipitated contains entrained moisture and some unconverted sodium sulphonate. The entrained moisture is preferably removed by the use of the centrifuge or similar means. The calcium sulphonate is then agitated with water and if it disintegrates, calcium chloride solution is again gradually added in amounts sufficient to produce complete coagulation. This washing and coagulation may be repeated a number of times if necessary until the calcium sulphonate is relatively free of sodium sulphonate whereupon it will no longer disintegrate when agitated with water.

The calcium sulphonate so produced is then dissolved in an organic solvent in which inorganic material is insoluble. The sulphonate is freely soluble in ethyl, methyl or isopropyl alcohol, benzol, or a mixture comprising these solvents in any proportion. I preferably employ ethyl or isopropyl alcohol of 75% or greater gravimetric concentration. After solution, settling and/or filtration, the solvent is evaporated to leave a residue of purified, dry, oil soluble, calcium sulphonate. An essential property of the calcium sulfonate so prepared is that it is not an emulsifying agent which makes possible its use in furniture—floor—etc. varnishes as described below. Such varnishes would be spoiled by the addition of compounds which are emulsifying agents.

This material is then incorporated with other varnish making materials to form a finished product. It may be added in any proportions ranging up to the total amount of gum or resin desired in the varnish although I preferably employ a varnish comprising a suitable diluent such as turpentine or mineral spirits in which the materials exclusive of diluent, viz, the varnish film forming materials are present in substantially the following proportions; 50 to 90% of drying oil, such as linseed or Chinawood oil, 5 to 25% of any of the usual resins such as ester gum, coumar or fossil resins, and 5 to 25% of the calcium salt of the oil soluble sulphonic acid.

The foregoing description of my method is in illustration and various alternative compositions may be adopted within the scope of the appended claims in which it is my intention to claim broadly all novelty inherent in the invention.

I claim:

1. A nonemulsified preparation of a drying oil for use as varnish comprising the calcium salt of an oil soluble sulphonic acid derived from the treatment of petroleum oils with fuming sulphuric acid or sulphuric anhydride.

2. A nonemulsified preparation of a drying oil for use as varnish, the film forming constituents of which comprise up to 25% of the calcium salt of an oil soluble sulphonic acid derived from the treatment of petroleum oils with fuming sulphuric acid or sulphuric anhydride.

3. A varnish, the film forming constituents of which are substantially in the following proportions: 50 to 90% drying oil, 5 to 25% resins, 5 to 25% calcium salt of an oil soluble sulphonic acid derived from the treatment of petroleum oil with fuming sulphuric acid or sulphuric anhydride.

HYYM E. BUC.